(12) United States Patent
Park

(10) Patent No.: US 8,032,192 B2
(45) Date of Patent: Oct. 4, 2011

(54) PORTABLE TERMINAL AND SLIDING/SWING-TYPE CRADLING APPARATUS THEREOF

(75) Inventor: Sang-Il Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 848 days.

(21) Appl. No.: 11/758,374

(22) Filed: Jun. 5, 2007

(65) Prior Publication Data

US 2007/0287307 A1 Dec. 13, 2007

(30) Foreign Application Priority Data

Jun. 8, 2006 (KR) ........................ 10-2006-0051605

(51) Int. Cl.
*H04B 1/08* (2006.01)
*H04M 1/00* (2006.01)
*H04M 9/00* (2006.01)

(52) U.S. Cl. .................. 455/575.4; 455/575.1; 455/347; 379/428.01; 379/433.12

(58) Field of Classification Search ............... 455/575.1, 455/575.4, 575.3, 128, 347; 379/428.01, 379/433.01, 433.12, 440
See application file for complete search history.

(56) References Cited

U.S. PATENT DOCUMENTS

| | | | | |
|---|---|---|---|---|
| 7,076,058 | B2 * | 7/2006 | Ikeuchi et al. | 379/433.12 |
| 7,199,313 | B1 * | 4/2007 | Kemppinen | 200/5 A |
| 7,283,841 | B2 * | 10/2007 | Luke et al. | 455/556.1 |
| 7,376,450 | B2 * | 5/2008 | Chen | 455/575.4 |
| 7,546,150 | B2 * | 6/2009 | Makino | 455/575.1 |
| 7,627,355 | B2 * | 12/2009 | Amano et al. | 455/575.4 |
| 2005/0227747 | A1 * | 10/2005 | Song | 455/575.3 |
| 2006/0003708 | A1 * | 1/2006 | Jantti et al. | 455/90.3 |
| 2006/0251244 | A1 * | 11/2006 | Gronroos et al. | 379/433.01 |
| 2006/0293093 | A1 * | 12/2006 | Marcus | 455/575.3 |
| 2007/0037618 | A1 * | 2/2007 | Lee | 455/575.4 |
| 2007/0135181 | A1 * | 6/2007 | Ohki et al. | 455/575.1 |
| 2008/0167097 | A1 * | 7/2008 | Ko | 455/575.4 |

* cited by examiner

*Primary Examiner* — Andrew Wendell
(74) *Attorney, Agent, or Firm* — H.C. Park & Associates, PLC

(57) ABSTRACT

Disclosed are a portable terminal and sliding/swing-type cradling apparatus thereof. The portable terminal includes a first housing, a second housing that slides along the first housing and faces the first housing, and a third housing including a display unit. The third housing is movable from a termination position after sliding along the first housing with the second housing and rotating when the display unit is inclined.

27 Claims, 19 Drawing Sheets

PORTABLE TERMINAL AND SLIDING/SWING-TYPE CRADLING APPARATUS THEREOF

CROSS REFERENCE TO RELATED APPLICATION

This application claims priority from and the benefit of Korean Patent Application No. 10-2006-0051605, filed on Jun. 8, 2006, which is hereby incorporated by reference for all purposes as if fully set forth herein.

BACKGROUND OF THE INVENTION

1. Field of the Invention

The present invention relates to a portable terminal which may be a Digital Multimedia Broadcasting phone (DMB phone), a game phone, a chatting phone, a camera phone, an MP3 phone, a cellular phone, a Personal Communication System (PCS), a Personal Digital Assistant (PDA), a Hand Held Phone (HHP), or the like. More particularly, the present invention relates to a portable terminal through which a user can conveniently watch television.

2. Discussion of the Background

In general, a "portable terminal" refers to an electronic device that a user can carry and use to communicate with another user wirelessly. In consideration of portability, the designs of portable terminals have tended not only toward compactness, slimness and lightness, but also toward providing multimedia capabilities to allow the user to pursue a wider variety of functions. In particular, future portable terminals may not only be multi-functional, compact and light, but may additionally be modified to be suitable for functioning in a multimedia environment and for providing internet access and functions. Additionally, such portable terminals may be used by men and women, young and old, anywhere in the world, and may be considered a necessity by users.

Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip panel which is pivotally mounted to a bar-shaped housing by a hinge unit. The folder-type portable terminal has a folder coupled to a single bar-shaped housing by a hinge unit in such a manner that the folder can be rotated in order to be folded or unfolded from the housing.

Further, portable terminals may be classified as neck wearable-type terminals and wrist wearable-type terminals, according to the position or way in which a user wears the terminal. The neck wearable-type terminal is one which a user wears around the neck using a lanyard or necklace, while the wrist wearable-type terminal is one which a user wears around the wrist.

Additionally, portable terminals may be classified as rotation-type terminals and sliding-type terminals according to the way in which the terminal is opened and closed. In a rotation-type portable terminal, two housings face each other and are coupled together. One housing rotates to be opened or closed relative to the other. In the sliding-type portable terminal, two housings are coupled to each other such that one housing slides to be opened or closed relative to the other. The various classifications of portable terminals are easily understood by those skilled in the art.

Further, each conventional portable communication terminal has been converted to allow voice communication as well as high-speed data communication. That is, as consumer demands have increased, various services have been provided using wireless communication technology for transmitting and receiving data at a high speed.

It is a present tendency to have a camera lens mounted to the portable communication terminal and it is possible to transmit image signals and the like. Present portable communication terminals are provided with an embedded or external camera lens module. Therefore, it is possible to conduct image communication with a desired partner or to photograph a desired subject.

However, conventional portable terminals have several problems. A separate cradle must be used to allow a user to watch information displayed on a display unit conveniently. It is well known that a user is more comfortable watching information displayed on the display unit which is cradled and inclined, while facing the inclined display unit. However, unless the conventional portable terminal has a separate cradle, the user watches the inclined body while gripping the body with a hand. While the user may watch images displayed on the display unit without a separate cradle by positioning the terminal on a table, such an arrangement is very inconvenient.

Similarly, in the case of playing a game on the portable terminal, the user has to grip the portable terminal with a hand while pressing buttons with the other hand. Therefore, it may be difficult for the user to play the game.

SUMMARY OF THE INVENTION

The present invention provides a portable terminal that may allow a user to watch television and moving pictures more conveniently and play games more easily.

The present invention also provides a sliding/swing-type cradling apparatus for a portable terminal, which can cradle a display unit of the portable terminal at a desired angle as soon as the display unit slides and allow it swing in the cradled state, which may allow a user to watch television and moving pictures more conveniently and play games more easily.

Additional features of the invention will be set forth in the description which follows, and in part will be apparent from the description, or may be learned by practice of the invention.

The present invention discloses a portable terminal including a first housing, a second housing sliding along the first housing and faces the first housing, and a third housing provided with a display unit. The third housing is movable from a termination position after sliding along the first housing with the second housing and rotatable when the display unit is inclined.

The present invention also discloses a sliding/swing-type apparatus for cradling a portable terminal, the portable terminal having a first housing, a second housing that slides along the first housing and faces the first housing, and a third housing provided with a display unit, wherein the third housing is movable from a termination position after sliding along the first housing with the second housing and rotatable when the display unit is inclined. The sliding/swing-cradling apparatus includes a sliding movement unit to allow the second and third housings to slide along the first housing, a cradling unit to incline the third housing with respect to the second housing, a swing hinge unit to rotate the third housing about a hinge axis extending perpendicular to an upper surface of the third housing when the third housing is inclined, and a locking unit. The locking unit restricts the sliding movement of the second housing and the third housing and allows the second housing and the third housing to move in a sliding direction from a movement termination position so that the cradling unit can be inclined and the swing hinge unit can rotate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
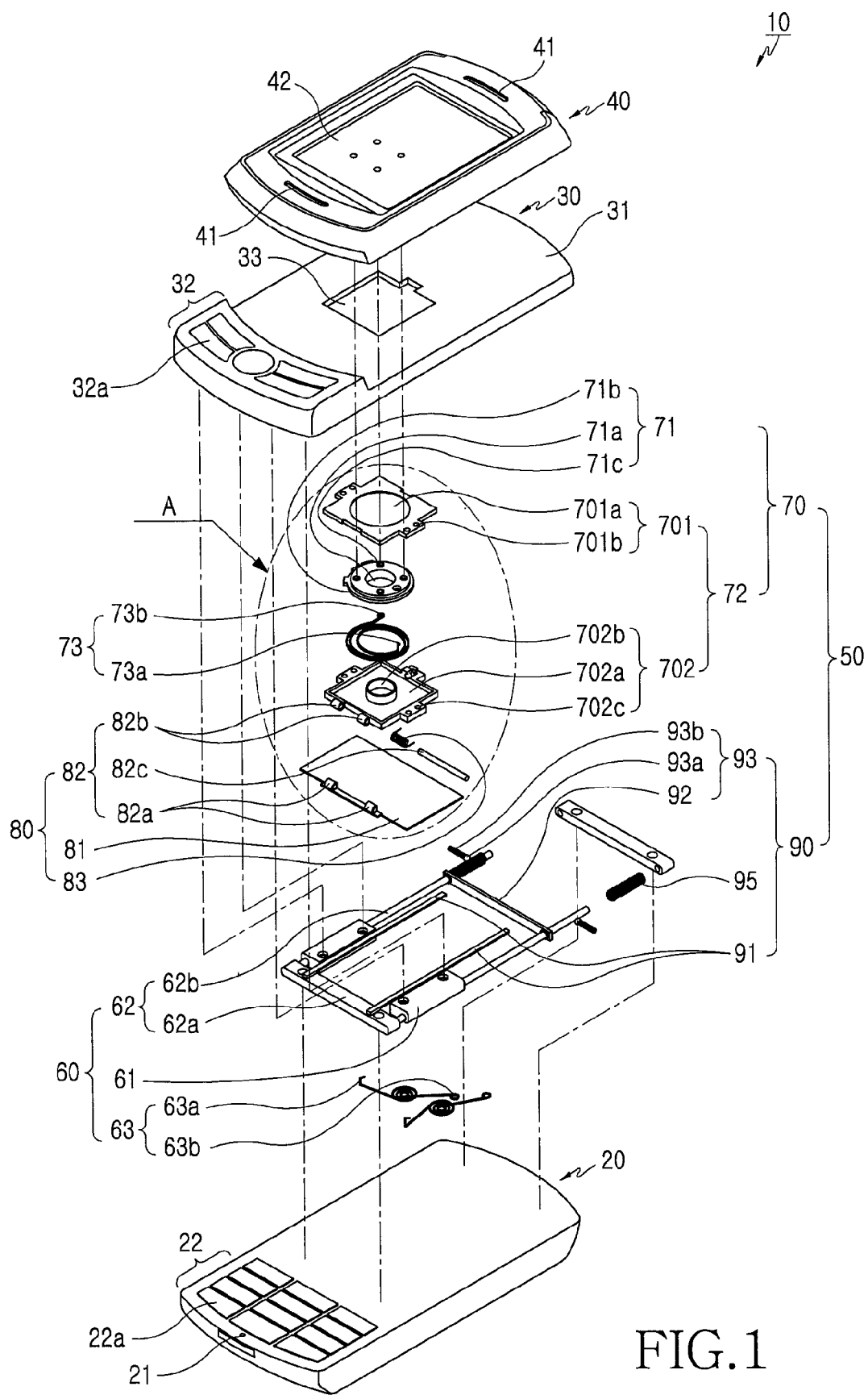
FIG. 1 is an exploded perspective view showing a configuration of a portable terminal and a sliding/swing-type cradling apparatus thereof according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
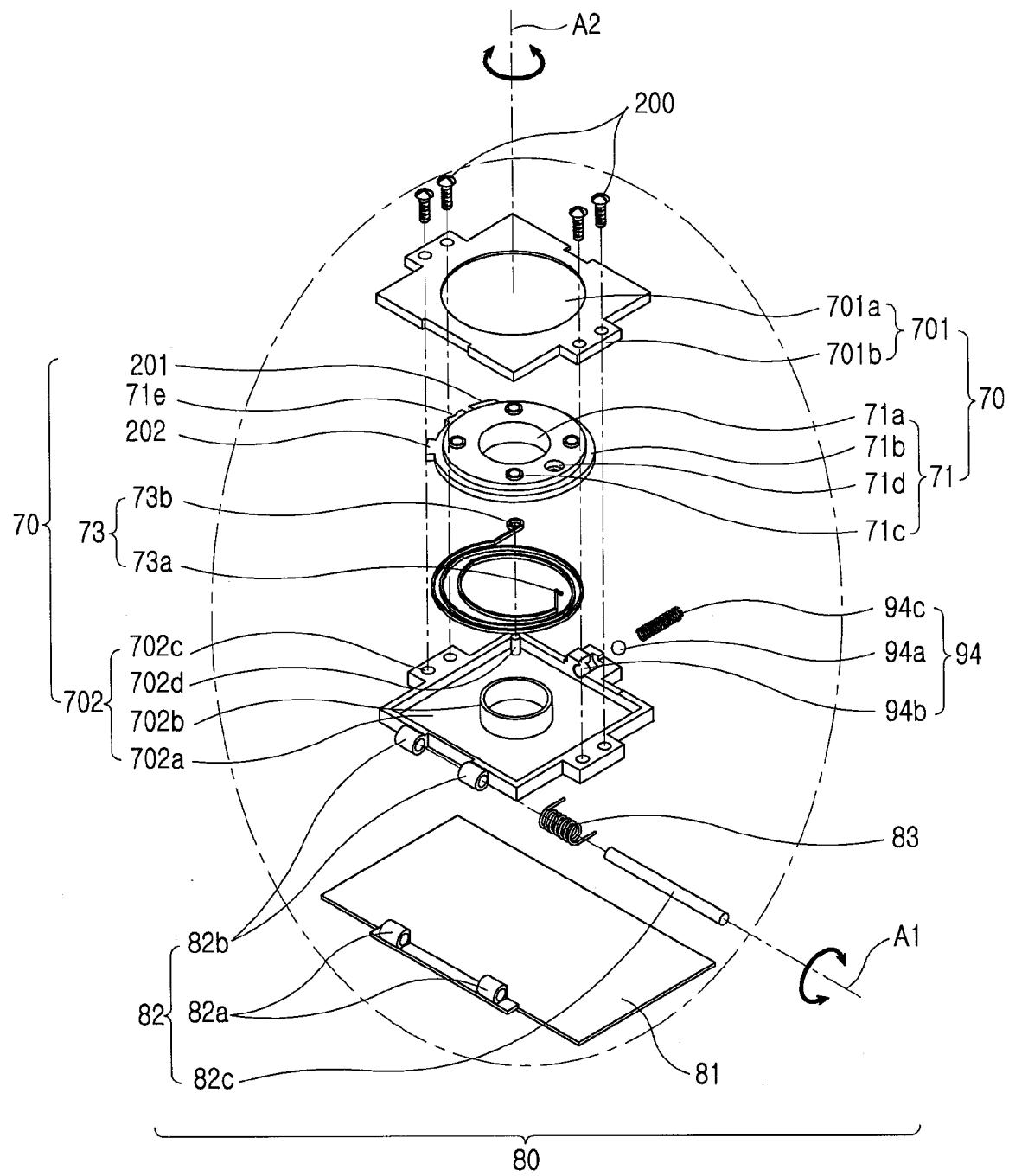
FIG. 2 is an exploded perspective view showing portion A of FIG. 1.

As shown in FIG. 1 and FIG. 2, a portable terminal 10 includes first, second, and third housings 20, 30 and 40 and a sliding/swing-type cradling apparatus 50. The sliding/swing-type cradling apparatus 50 includes a sliding movement unit 60, a swing hinge unit 70, a cradling unit 80, and a locking unit 90. The first housing 20 is coupled with the second housing 30 and faces the second housing 30, so that the second and third housings 30 and 40 can slide. The second housing 30 is disposed on an upper surface of the first housing 20 to slide along the first housing 20, while continuously facing the first housing 20. The third housing 40 is disposed on the upper surface of the second housing 30, is provided with a display unit 42, and slides along the first housing 20 with the second housing 30 to further extend from a terminal position in a sliding direction. In addition, the third housing 40 makes the display unit 42 incline and allows the display unit 42 to rotate in a cradled state.

Figure 4:
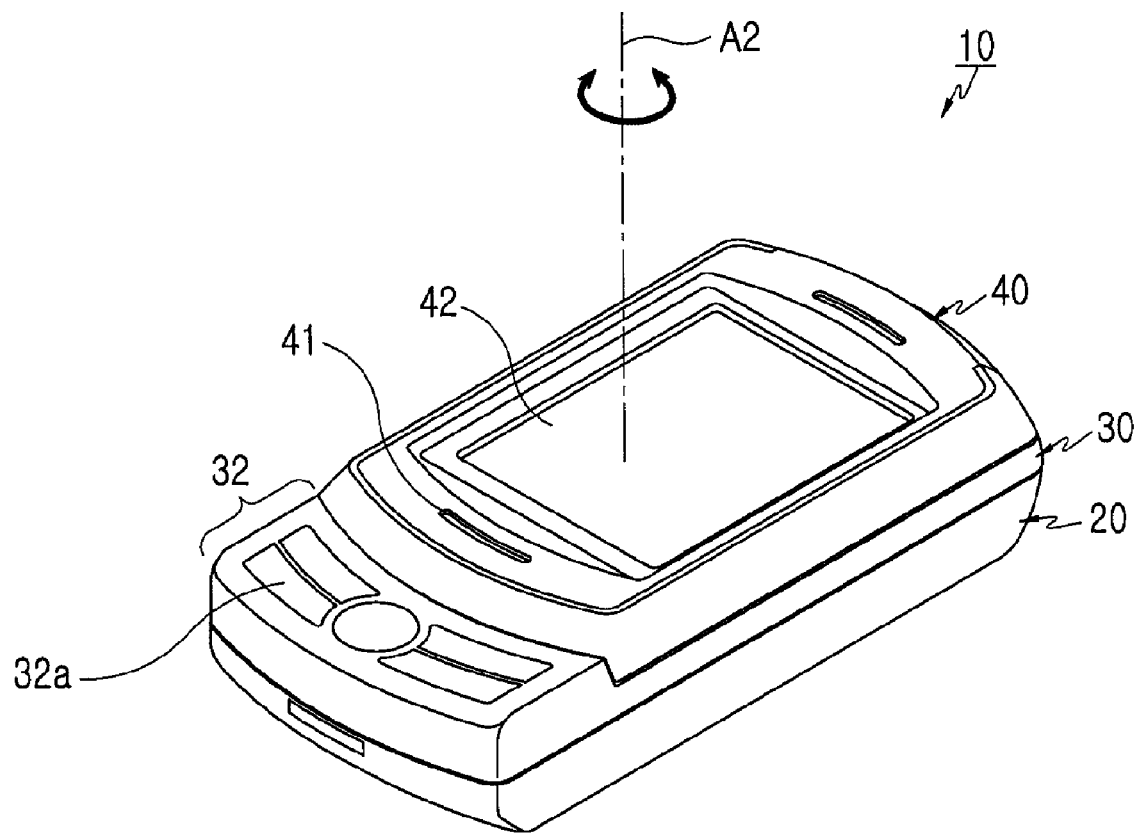
FIG. 4 is a perspective view showing the portable terminal and the sliding/swing-type cradling apparatus thereof according to the exemplary embodiment of the present invention before the sliding/swing-type cradling apparatus operates.
Figure 6:
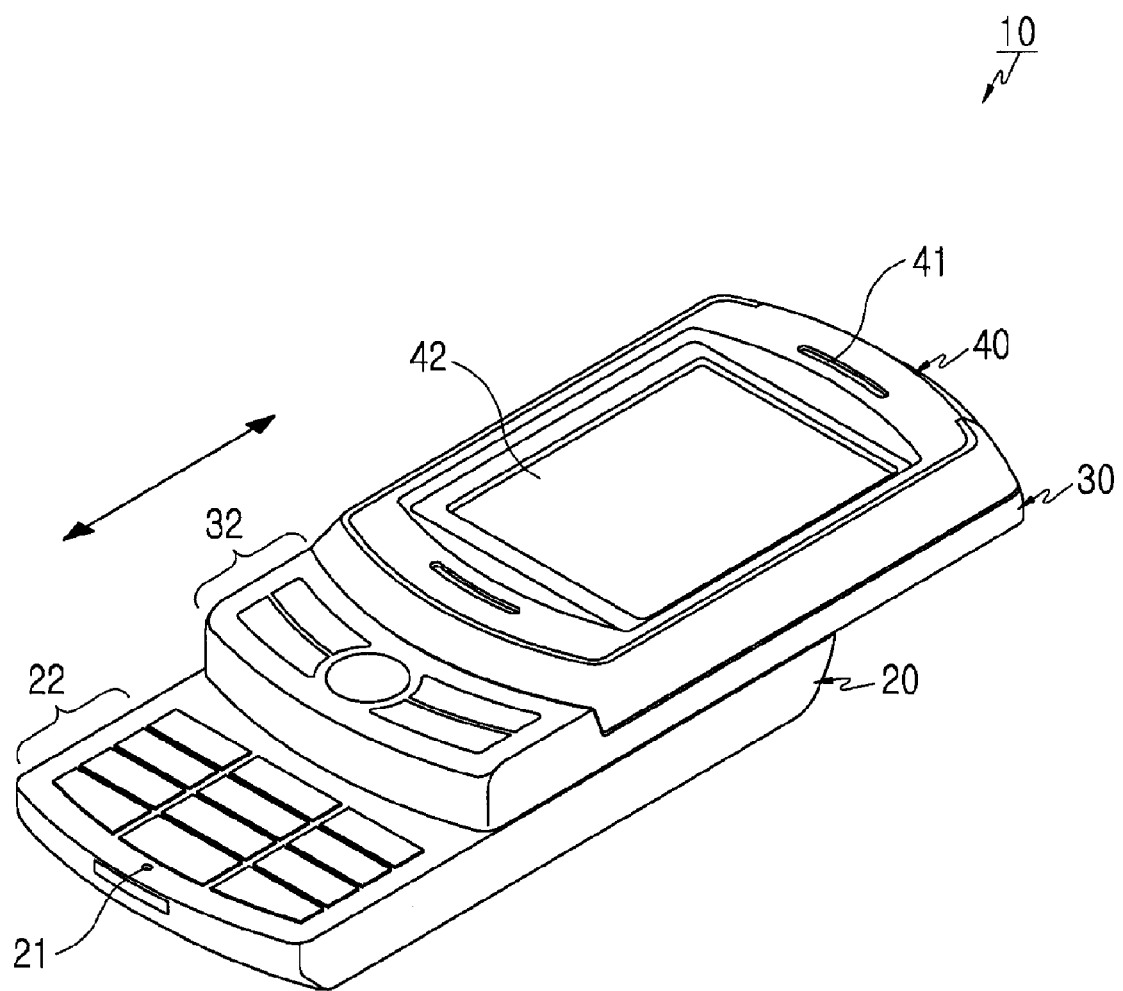
FIG. 6 is a perspective view showing the portable terminal and the sliding/swing-type cradling apparatus thereof according to the exemplary embodiment of the present invention, in which the second and third housings are slidably moved.

As shown in FIG. 1 and FIG. 4, the first housing 20 is provided with a first keypad 22 including a first speaker unit 21 and a plurality of keys 22a. The second housing 30 is provided with a second keypad 32 including a plurality of keys 32a. As shown in FIG. 1 and FIG. 6, the second housing 30 has a mounting surface 31 recessed at a desired depth so that the third housing 40 may be mounted facing the second housing 30. The third housing 40 may be provided with a plurality of second speaker units 41.

As shown in FIG. 1, the sliding movement unit 60 is interposed between the first and second housings 20 and 30 so that the second and third housings 30 and 40 can slide along the first housing 20. The cradling unit 80 is disposed between the sliding movement unit 60 and the swing hinge unit 70 so that the third housing 40 is cradled and inclined with respect to the second housing 30. The swing hinge unit 70 is disposed on the second housing 30, and enables the third housing 40 to be cradled and inclined with respect to the second housing 30. In this state, the swing hinge unit 70 allows the third housing 40 to rotate about a hinge axis A1 extending perpendicular to the upper surface of the third housing 40.

Figure 3:
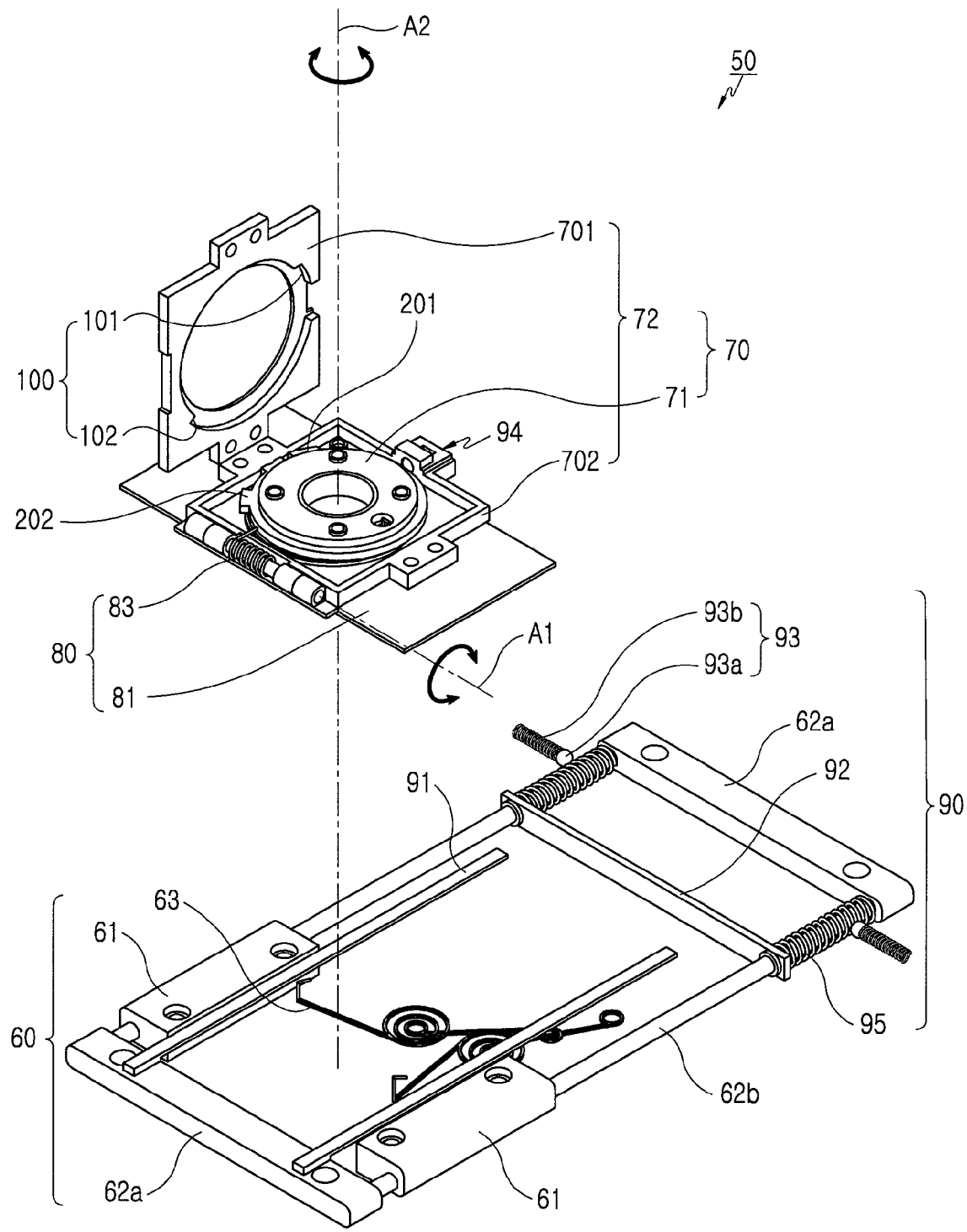
FIG. 3 is an exploded perspective view showing the portable terminal and the sliding/swing-type cradling apparatus thereof according to the exemplary embodiment of the present invention.
Figure 10:
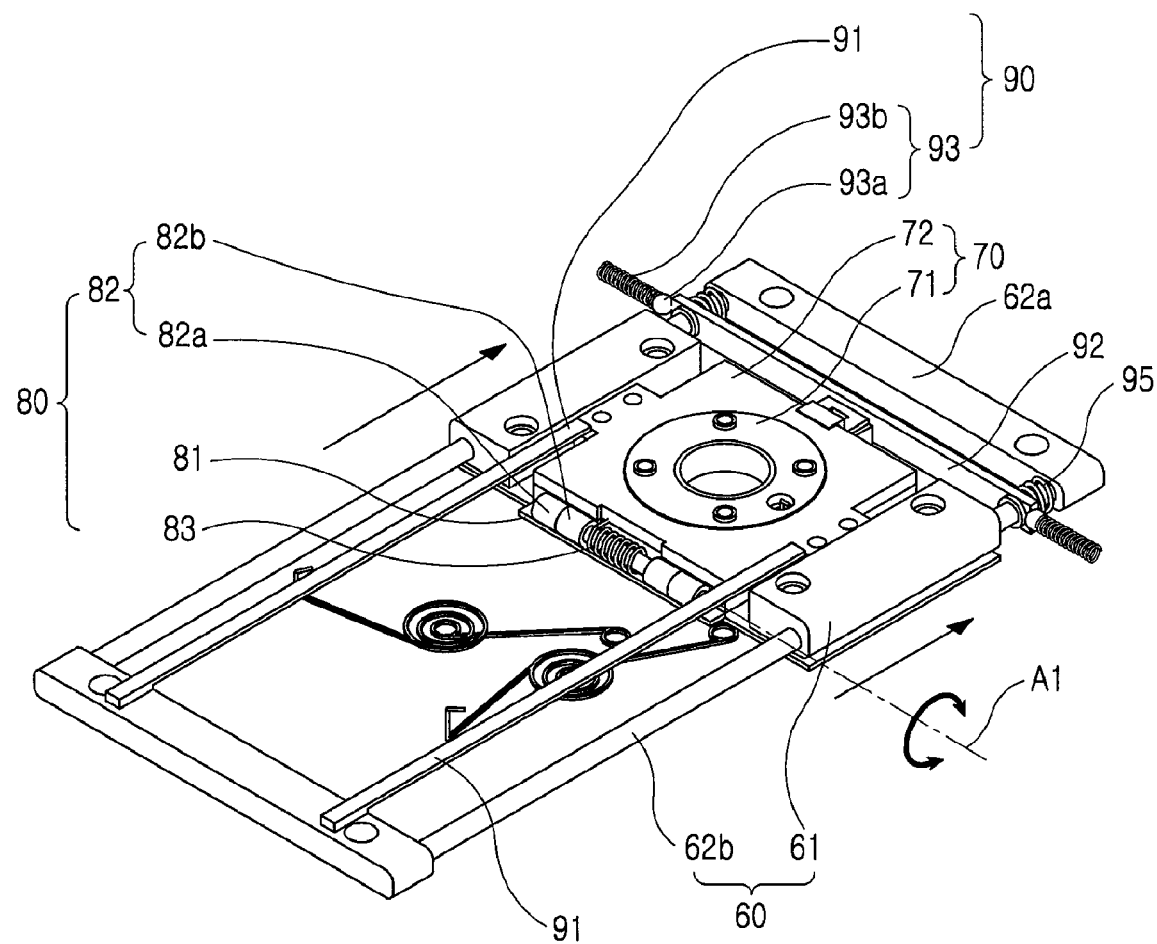
FIG. 10 is a perspective view showing the sliding/swing-type cradling apparatus of the portable terminal according to the exemplary embodiment of the present invention, in which the operation of a locking member is shown.
Figure 11:
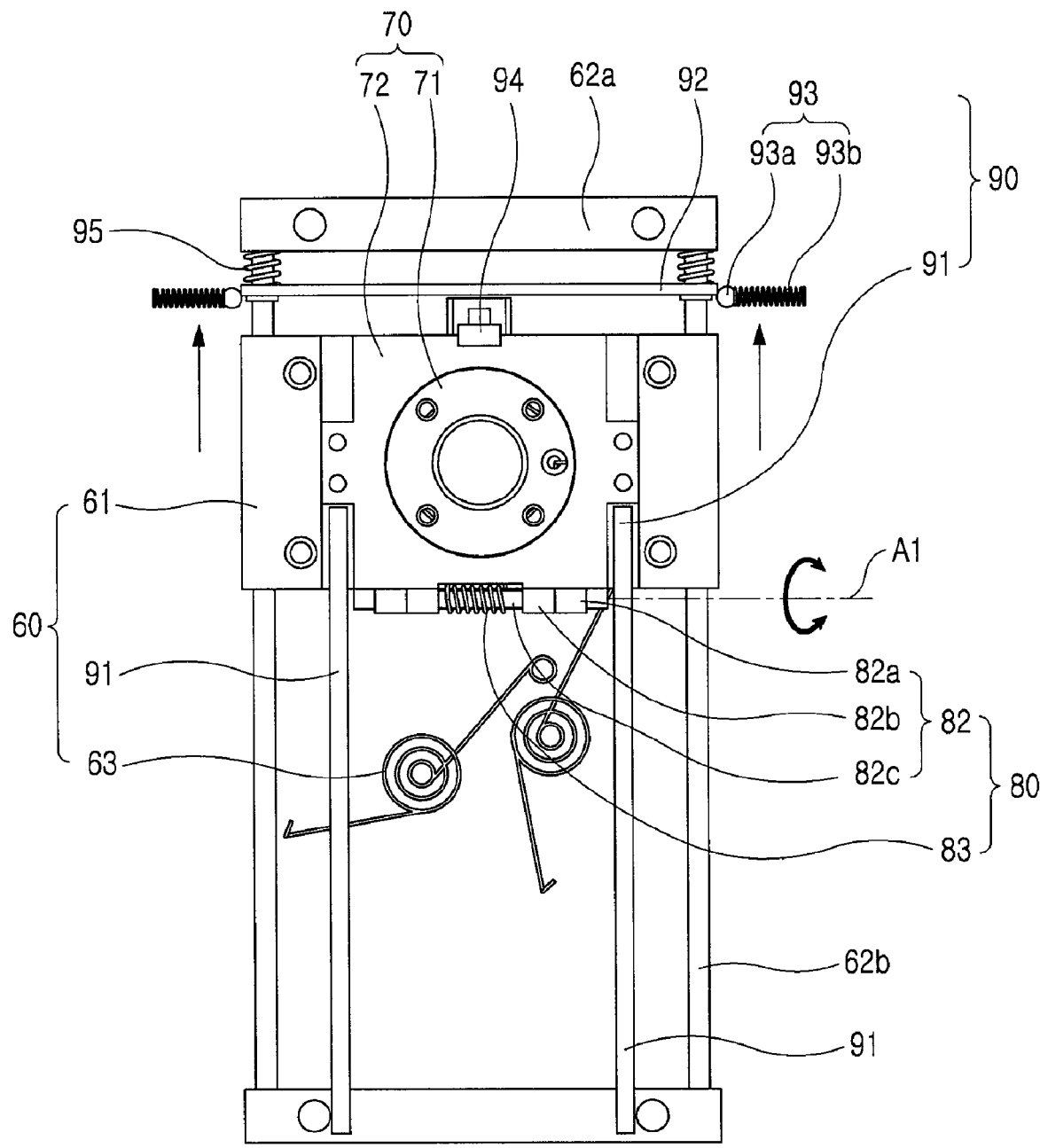
FIG. 11 is a plan view showing the sliding/swing-type cradling apparatus of the portable terminal according to the exemplary embodiment of the present invention, in which the operation of the locking member is shown.

As shown in FIG. 3, FIG. 10, and FIG. 11, the locking unit 90 is disposed on the sliding movement unit 60 so that the cradling unit 80 may be cradled and inclined, the third housing 40 may be rotated by latching the second and third housings 30 and 40 to restrict the movement of the second and third housings 30 and 40 while the second and third housings 30 and 40 slide, or the second and third housings 30 and 40 may be allowed to move beyond the sliding termination position in a sliding direction.

As shown in FIG. 1, FIG. 3, FIG. 5, FIG. 7, and FIG. 8, the sliding movement unit 60 includes a pair of sliding movement members 61, a pair of guide members 62, and force applying means 63. The sliding movement member 61 is mounted on the second housing 30 and coupled to the guide members 62 to slide along the guide members 62. The guide members 62 are mounted on the first housing 20 and are assembled with the sliding movement member 61 to guide the sliding movement of the sliding movement member 61. The force applying means 63 is interposed between the first housing 20 and the sliding movement member 61. While the sliding movement member 61 slidably moves, the force applying means 63 applies force to the sliding movement member 61 in order to open or close the sliding movement member 61 if the sliding movement member 61 moves beyond a specific distance or if it does not move beyond a specified distance, respectively.

As shown in FIG. 3, the guide member 62 has a pair of ribs 62a coupled to the first housing 20. The ribs 62a are provided with a pair of guide rods 62b in order to guide the sliding movement of the sliding movement member 61.

Figure 7:
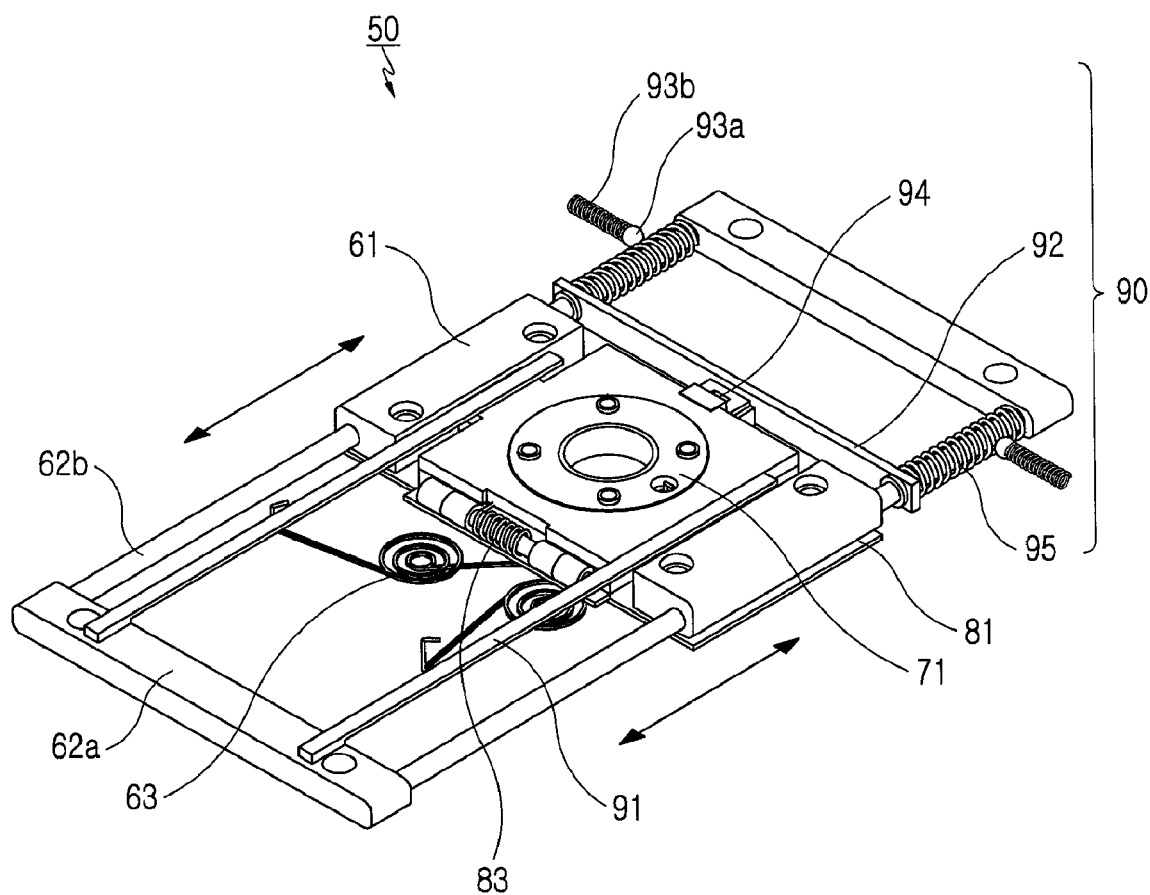
FIG. 7 is a perspective view showing the sliding/swing-type cradling apparatus of the portable terminal according to the exemplary embodiment of the present invention, in which a sliding member slides.
Figure 8:
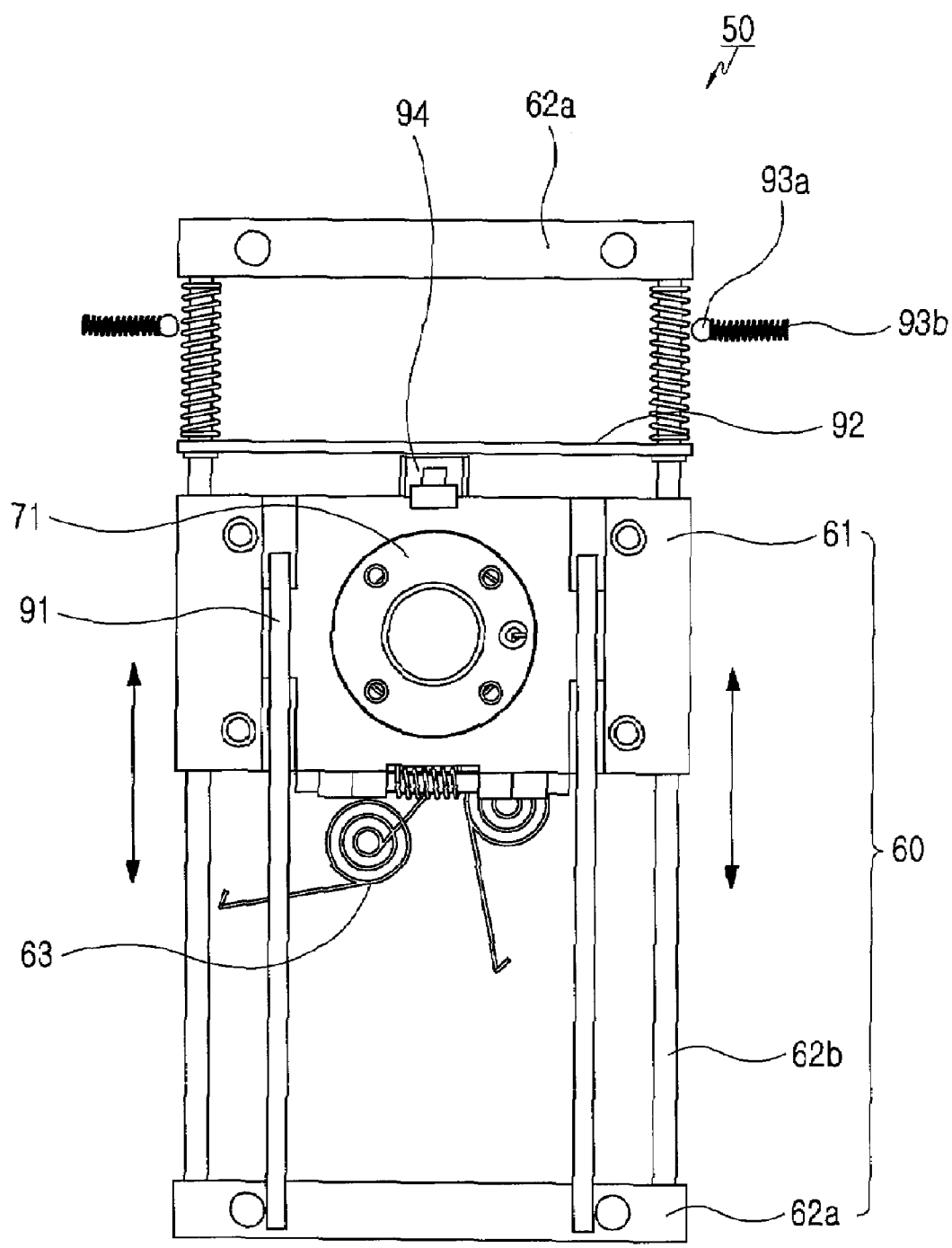
FIG. 8 is a plan view showing the sliding/swing-type cradling apparatus of the portable terminal according to the exemplary embodiment of the present invention, in which the sliding member slides.

As shown in FIG. 1, FIG. 7, and FIG. 8, the force applying means 63 may be made of an elastic body. The elastic body has one end 63a fixed to the sliding movement member 61 and the other end 63b fixedly coupled to the first housing 20, so as to move along a predetermined trajectory as the second housing 30 slides.

As shown in FIG. 2, FIG. 12, FIG. 13, FIG. 14, and FIG. 15, the cradling unit 80 includes a base member 81, cradling hinge means 82, and cradle-side force applying means 83. The base member 81 is coupled to the sliding movement member 61 and is rotatably coupled to the cradling hinge means 82, as described below. The cradling hinge means 82 provides a hinge axis A1 and is attached to the swing hinge unit 70 and the base member 81 so that the swing hinge unit 70 may rotate about the hinge axis A1 and be inclined with respect to the base member 81. The cradle side force applying means 83 is mounted on the cradling hinge means 82 and is released by the locking unit 90. At the same time, the cradle side force applying means simultaneously urges the swing hinge unit 70 so that the swing hinge unit 70 rotates.

As shown in FIG. 2, the cradling hinge means 82 includes first and second hinge arms 82a and 82b and a hinge rod 82c. The first hinge arm 82a is formed at a side of the base member 81 to be rotatably coupled with the second hinge arm 82b described below. The second hinge arm 82b is formed at a side of the swing hinge unit 70 so as to be rotatably coupled with the first hinge arm 82a. The hinge rod 82c extends through hinge holes of the first and second hinge arms 82a and 82b to connect the first and second hinge arms to each other. The cradle side force applying means 83 may be made of an elastic body.

As shown in FIG. 1, FIG. 3, FIG. 14, and FIG. 15, the locking unit 90 includes at least one locker 91, a stopper 92, click members 93, and a locker side force supply means 95. The locker 91 is fixed to a rib 62a of the guide unit 62, allowing the locker 91 to come into contact with swing hinge unit 70 so as to restrict the sliding movement member when the sliding movement member slides or to separate the locker 91 from the swing hinge unit 70 to release the sliding movement member after the sliding movement of the sliding movement member. The stopper 92 is formed at an end of the locker 91 to restrict the movement of the sliding movement member 61 and the swing hinge unit 70 at a sliding termination position. The click members 93 are disposed adjacent to the stopper 92 to inform a user that the locker 91 has been released from the swing hinge unit 70. The sliding movement member 61 moves with the swing hinge unit 70 and the stopper 92 to a position at which the locker 91 unlatches the swing hinge unit 70 and comes into contact with the stopper 92 to provide a click. The locker side force applying means 95 is coupled to the guide rod 62b of the guide unit 62 in order to release the swing hinge unit 70, as well as to force the stopper 92 to return to an initial position.

Figure 14:
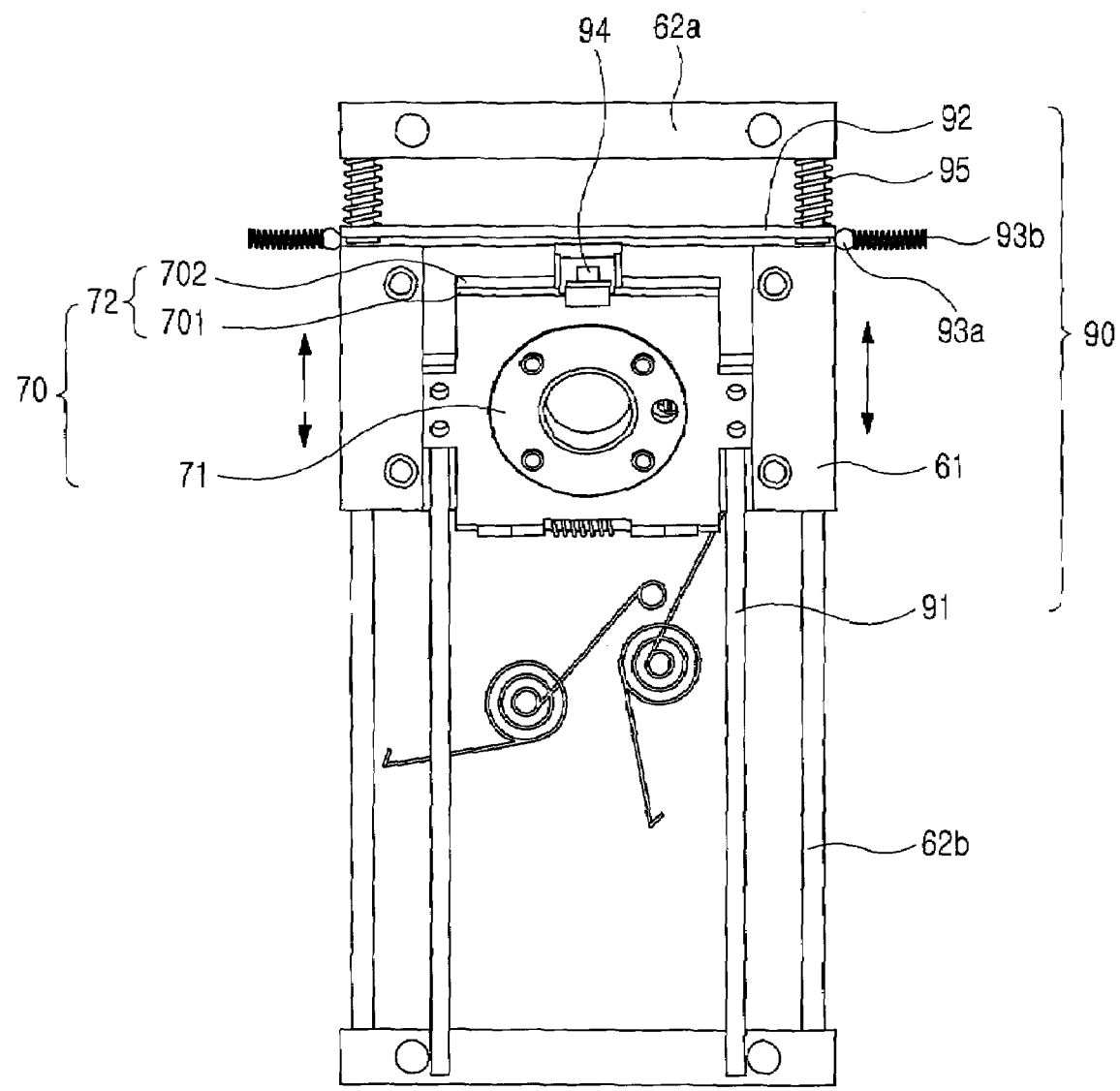
FIG. 14 is a plan view showing the sliding/swing-type cradling apparatus of the portable terminal according to the exemplary embodiment of the present invention, in which the cradling apparatus is inclined.
Figure 15:
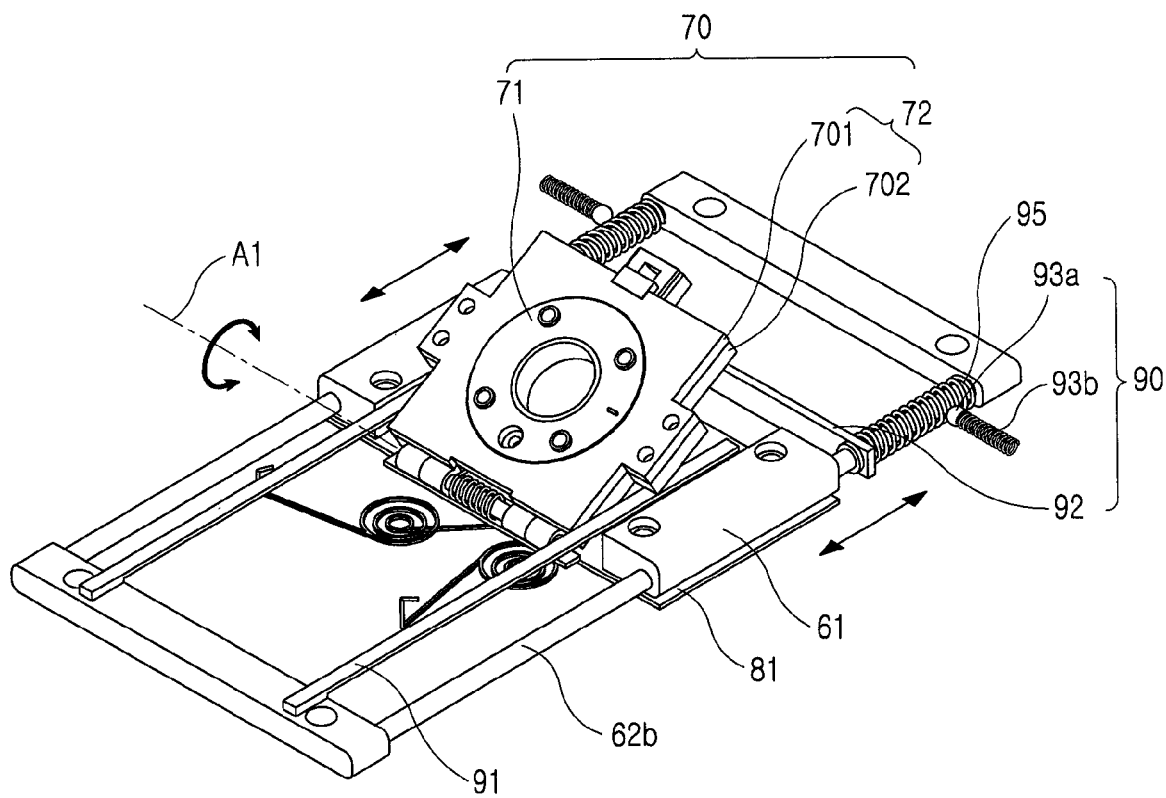
FIG. 15 is a perspective view showing the sliding/swing-type cradling apparatus of the portable terminal according to the exemplary embodiment of the present invention, after the locking member operates.

As shown in FIG. 3, FIG. 14, and FIG. 15, the locker 91 has a bar shape, and extends to the sliding termination position of the swing hinge unit 70. The click members 93 are arranged on both sides of the guide unit 62, and each have a contact member 93a to provide a click when the click members 93 contact the stopper 92. The contact members 93a are each provided with a coil spring 93b which provides elasticity to the contact member 93 and enables the contact member 93a to come into contact with the stopper 92 to provide a click. The locker side force applying means 95 may be made of elastic body.

Figure 5:
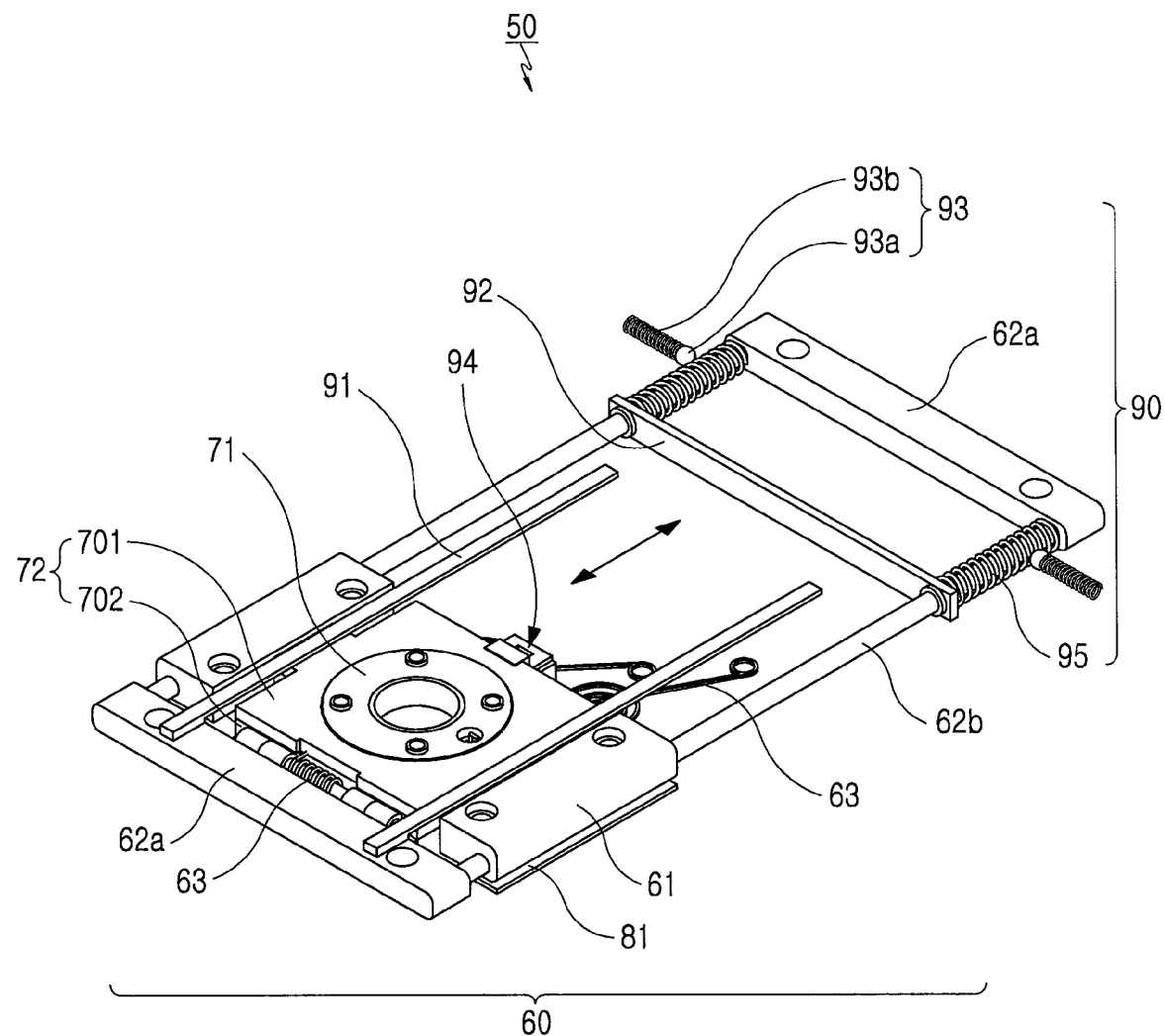
FIG. 5 is a perspective view showing the sliding/swing-type cradling apparatus of the portable terminal according to the exemplary embodiment of the present invention, in which the sliding/swing-cradling apparatus is assembled.

As shown in FIG. 2, FIG. 3, FIG. 17, FIG. 18, and FIG. 19, the swing hinge unit 70 includes a rotary member 71, a swing hinge member 72, a force applying means 73, and a swing locker 94. The rotary member 71 provides a hinge axis A2, is coupled with the third housing 40, and is rotatably coupled with the swing hinge member 72. The swing hinge member 72 is interposed between a pair of sliding movement members 61 to be rotatably coupled with the rotary member 71. The swing force applying means 73 is embedded in the swing hinge member 72 to apply force to and rotate the rotary member 71. As shown in FIG. 5, the swing locker 94 is disposed around the swing hinge member 72 so as to be detachably engaged with the rotary member 71, and to restrict the rotation of the rotary member 71 as the rotary member 71 rotates.

As shown in FIG. 1, the second housing 30 has a coupling hole 33 formed therein, through which the swing hinge unit 70 is rotatably assembled with the second housing 30.

Figure 17:
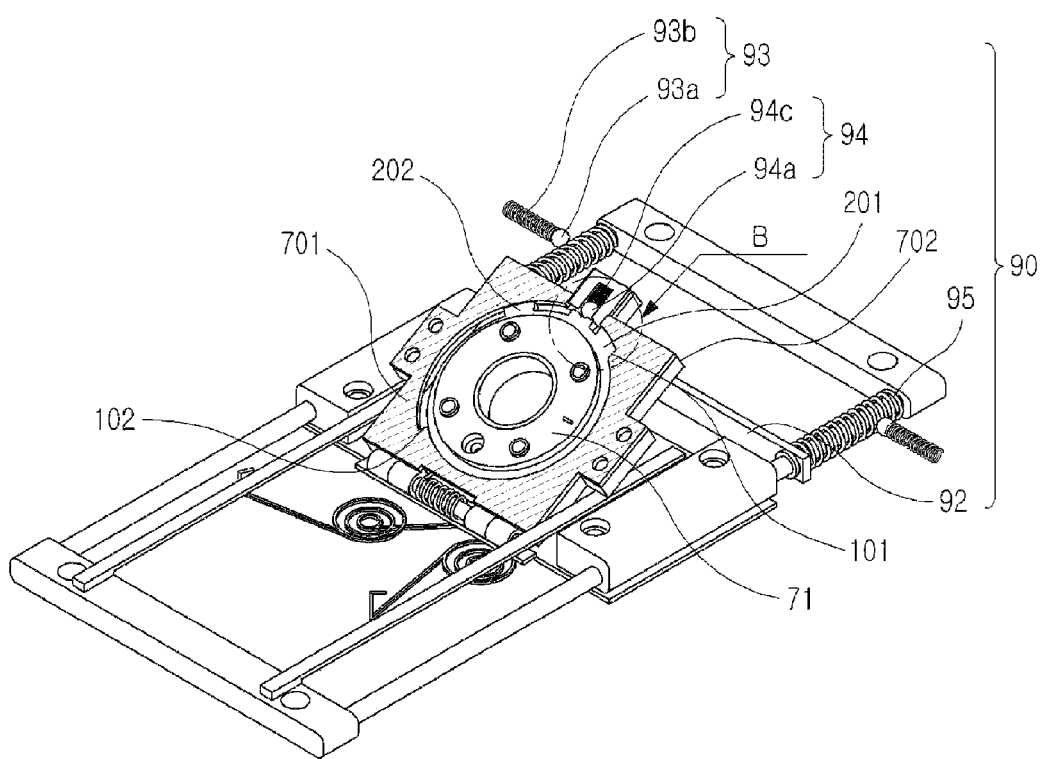
FIG. 17 is a perspective view showing the sliding/swing-type cradling apparatus of the portable terminal according to the embodiment of the present invention, before a swing hinge member is rotated when the cradling apparatus is inclined.

As shown in FIG. 2, FIG. 3, and FIG. 17, the rotary member 71 has a through hole 71a, a separation prevention jaw 71b, and at least one screw coupling portion 71c. The through hole 71a is formed at the center portion of the rotary member 71 and receives a cylinder shaped housing 702b of the second hinge member 702 of the swing hinge member 72. The separation prevention jaw 71b is formed on an edge of the rotary member 71 and is rotatably inserted in a rotation hole 701a formed in the first hinge member 701 of the swing hinge member 72, so as to prevent the separation of the rotary member 71. The screw holes 71c are formed on an upper surface of the rotary member 71 in order to couple the rotary member 71 to the third housing 40 with screws 200.

As shown in FIG. 1 and FIG. 3, the swing hinge member 72 includes first and second hinge members 701 and 702. The first hinge member 701 has a rotation hole 701a formed at the center portion thereof, in which the rotary member 71 is rotatably received. The first hinge member 701 has first screw holes 701b formed at an edge thereof, and is coupled to the second hinge member 702 with screws 200. The second hinge member 702 has a receiving space 702a formed to receive the swing force applying means 73. The cylinder shaped housing 702b protrudes from the center portion of the receiving space 702a and is inserted into the through hole 71a formed in the rotary member 71. The second hinge member 702 has second screw holes 702c formed at an edge thereof to correspond to the first screw holes 701b formed in the first hinge member 701.

As shown in FIG. 1 and FIG. 2, the swing force applying means 73 includes a spiral spring, one end 73a of which is inserted in a spring hole 71d formed in the rotary member 71, and the other end 73b of which is coupled with a spring coupling protrusion 702d formed in the receiving space 702a of the second hinge member 702.

Figure 18:
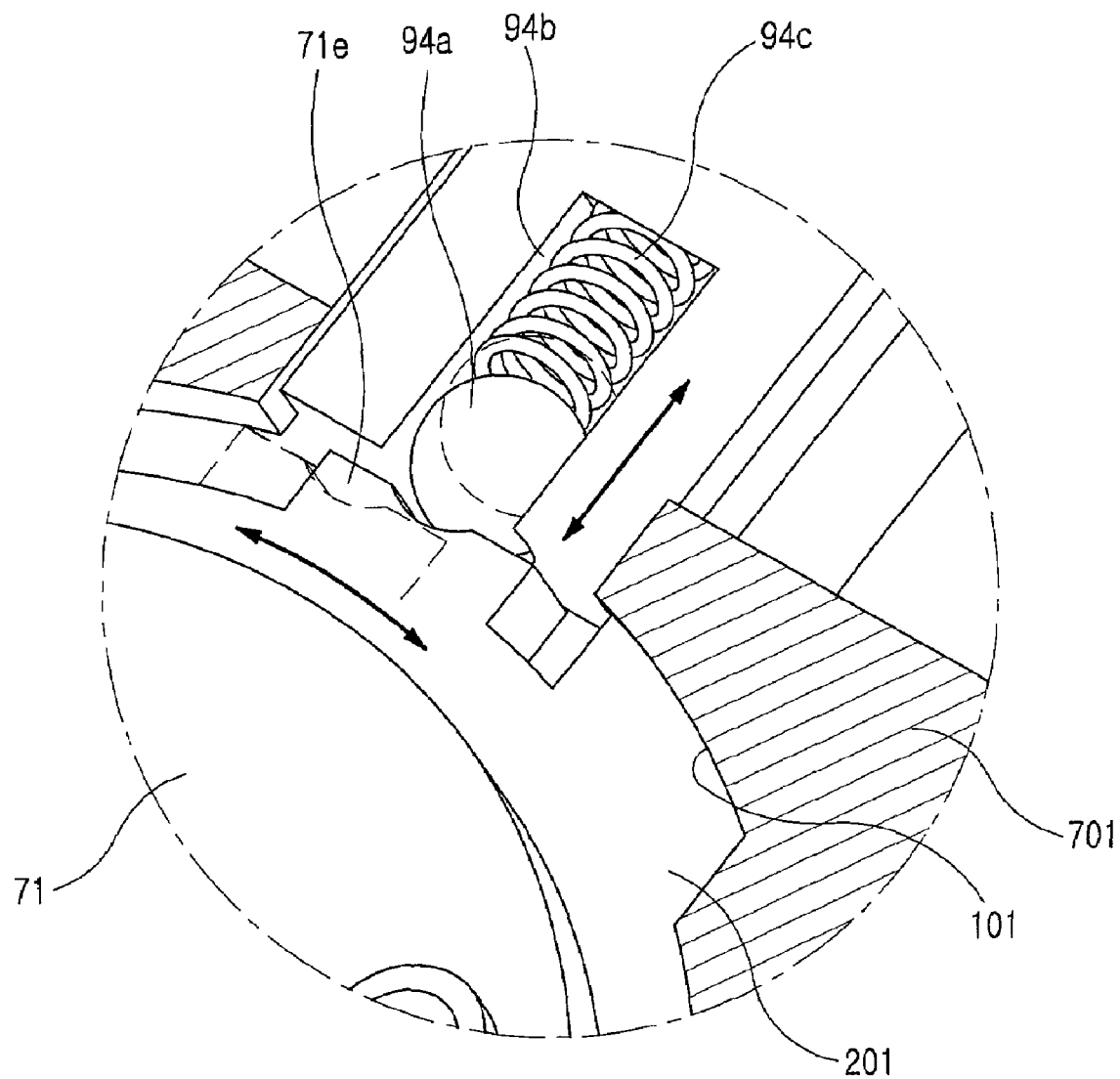
FIG. 18 is an enlarged perspective view showing portion B in FIG. 17.
Figure 19:
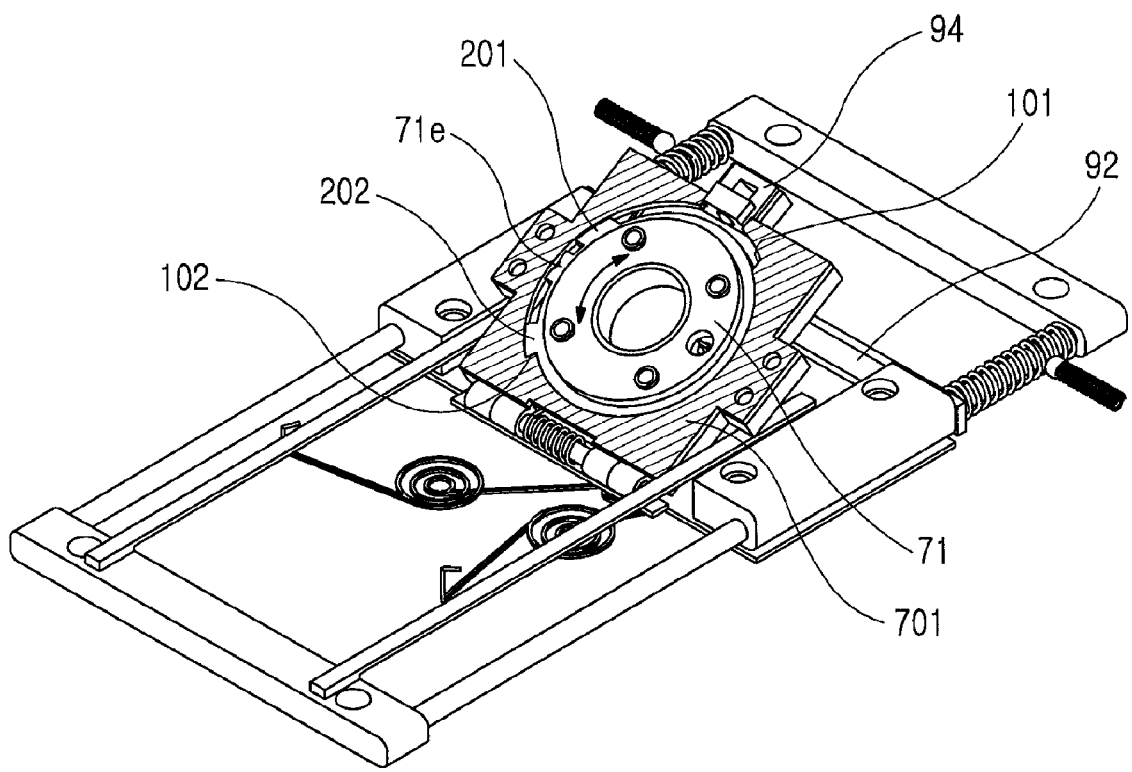
FIG. 19 is a perspective view showing the sliding/swing-type cradling apparatus of the portable terminal according to the embodiment of the present invention, after the swing hinge member is rotated when the cradling apparatus is inclined.

As shown in FIG. 17, FIG. 18, and FIG. 19, the swing locker 94 includes a locking member, which is detached from the locker 71e protruding from an outer peripheral of the rotary member 71 to restrict or release the rotation of the rotary member 71 as the third housing 40 rotates along with the rotary member 71 in the state of being cradled to be inclined. The swing locker 94 includes a movement member 94a, a guide recess 94b, and a coil spring 94c. The movement member 94a is disposed in the guide recess 94b while contacting with the locker 71e of the rotary member 71. The movement member 94a slides along a peripheral surface of the locker 71e to latch or release the rotary member 71. The guide recess 94b is formed at an edge of the second hinge member 702 to receive the movement member 94a and guide the sliding movement of the movement member 94a. The coil spring 94c is disposed in the guide recess 94b in order to provide elasticity to the movement member 94a so that the movement member 94a slides.

As shown in FIG. 18, the movement member 94a includes a spherical ball.

As shown in FIG. 3, FIG. 17, FIG. 18, and FIG. 19, the first hinge member 701 is provided with a rotary stopper 100, which comes into contact with first and second stopper protrusions 201 and 202 protruding from the outer periphery of the rotary member 71 so as to restrict the rotation of the rotary member 71 and to enable the third housing 40 to rotate at an angle of 90 degrees. The rotary stopper 100 has a first stopper contact surface 101 formed at one end thereof and contacting the first stopper protrusion 201 to stop the rotary member 71 from rotating, and a second stopper contact surface 102 formed at the other end thereof and contacting with the second stopper protrusion 202 to rotate the rotary member 71 90 degrees around the hinge axis A2 or to stop the rotation of the rotary member 71.

Hereinafter, the operations of the portable terminal and the sliding/swing-type cradling apparatus thereof according to the exemplary embodiment of the present invention constructed as described above will be described in detail with reference to FIG. 1, FIG. 2, FIG. 3, FIG. 4, FIG. 5, FIG. 6, FIG. 7, FIG. 8, and FIG. 9 attached hereto.

As shown in FIG. 1, FIG. 2, and FIG. 3 the portable terminal 10 includes first, second, and third housings 20, 30, and 40 and a sliding/swing-type cradling apparatus 50. The sliding/swing-type cradling apparatus 50 includes the sliding movement unit 60, the swing hinge unit 70, the cradling unit 80, and the locking unit 90. The sliding movement unit 60 is provided with the sliding movement member 61, the guide member 62, and the force applying means 63. The sliding movement unit 60 is movably coupled to the guide rod 62b of the guide unit 62 and a rib 62a of the guide unit 62 is coupled to one end of each guide rod 62b.

The locking unit 90 is installed on the other ends of the guide rods 62b. In The base member 81 of the cradling unit 80 is assembled with the sliding movement member 61, while the swing hinge unit 70 is mounted to the base member 81 by the cradling hinge means 82 such that the swing hinge rotates about the hinge axis A1.

The first hinge arm 82a is formed at one end of the base member 81 and the second hinge arm 82b is formed on the swing hinge unit 70 and is rotatably coupled to the first hinge arm 82a. The first and second hinge arms 82a and 82b are coupled to each other and the hinge rod 82c is inserted into the hinge hole simultaneously. The cradle side force applying means 83 is mounted on the hinge rod 82c.

As shown in FIG. 1, FIG. 4, and FIG. 5, the rib 62a of the guide unit 62 is coupled to the first housing 20, and the sliding movement member 61 is joined to the second housing 30. The swing hinge unit 70 extends through the coupling hole 33 formed in the second housing 30 and is rotatably coupled to the second housing 30. The swing hinge unit 70 extending through the coupling hole 33 is coupled with the third housing 40. Then the third housing 40 is mounted on the recessed mounting surface 31 formed on the second housing 30.

As shown in FIG. 6, when the user slides the terminal 10, the second and third housings 30 and 40 movably slide along the first housing 20.

As shown in FIG. 7, the sliding movement member 61 moves along the guide rod 62b of the guide unit 62, and simultaneously, the swing hinge unit 70 and the cradling unit 80 move along with sliding movement member 61. The second and third housings 30 and 40 are subjected to force applied by the force applying means 63 interposed between the first housing 20 and the sliding movement member 61, which enables the housings 30 and 40 to open after moving a predetermined distance.

As shown in FIG. 8, the force applying means 63 may be made of an elastic body and has one end fixed to the sliding movement member 61 and the other end fixedly coupled to the first housing 20. The force applying means 63 moves along a desired trajectory as the second and third housings 30 and 40 are sliding.

In this state, the user can use the terminal 10 as a sliding-type portable terminal.

As shown in FIG. 8, the swing hinge unit 70 comes into contact with the locker 91 of the locking unit 90 and is prevented from rotating to an inclined position when the second and third housings 30 and 40 slide.

As shown in FIG. 7 and FIG. 8, the stopper unit 92 is formed at one end of the locker 91 in order to restrict the movement of the sliding movement member 61 and the swing hinge unit 70 at a sliding termination position. When the second and third housing 30 and 40 slide, the sliding movement member 61 and the swing hinge unit 70 move with the second and third housings 30 and 40 until the stopper unit 92 restricts the sliding movement of the second and third housings 30 and 40 at the sliding termination position.

Figure 9:
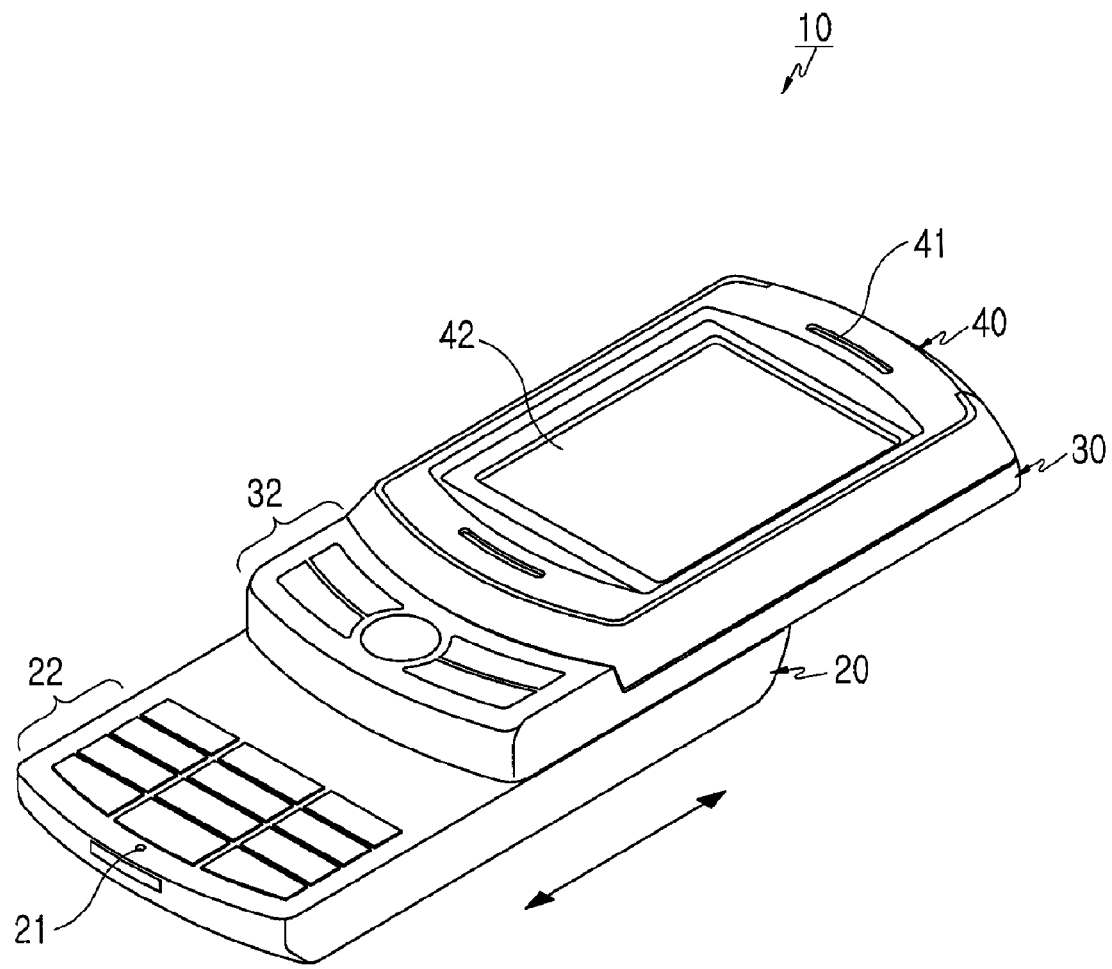
FIG. 9 is a perspective view showing the portable terminal and the sliding/swing-type cradling apparatus thereof according to the exemplary embodiment of the present invention, in which the second and third housings slide.

Here, as shown in FIG. 9, if the user intends to incline the display unit 42 of the terminal, the user slides the second and third housings 30 and 40 beyond the sliding termination position.

As shown in FIG. 10 and FIG. 11, the sliding movement member 61 and the swing hinge unit 70 further move with the second and third housings 30 and 40, and the stopper 92 also moves with them. The locking click members 93 are located adjacent to the stopper 92. When the stopper 92 moves to a position at which the swing hinge unit 70 is released from the locker 91, the stopper 92 come into contact with the locking click members 93 to provide a click. The locking click members 93 inform the user that the swing hinge unit 70 has been released from the locker 91 through the sound of the click.

Figure 12:
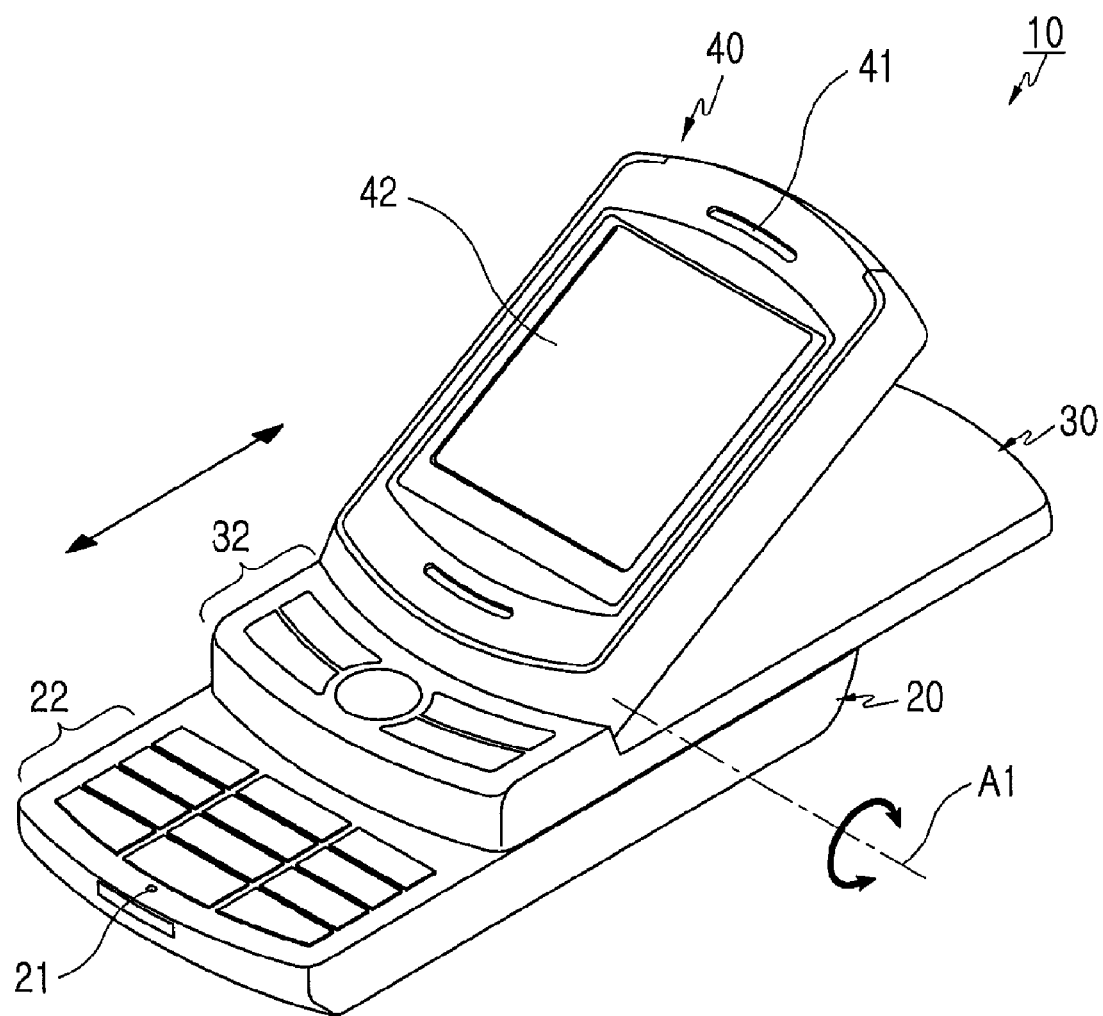
FIG. 12 is a perspective view showing the portable terminal and the sliding/swing-type cradling apparatus thereof according to the exemplary embodiment of the present invention, in which the third housing is cradled and inclined.

At this time, as shown in FIG. 12, when the swing hinge unit 70 is released from the locker 91, the cradle side force applying means 83 rotates and inclines the swing hinge unit 70. The third housing 40 is inclined to the second housing 30 after the sliding movement of the second housing 30.

Figure 13:
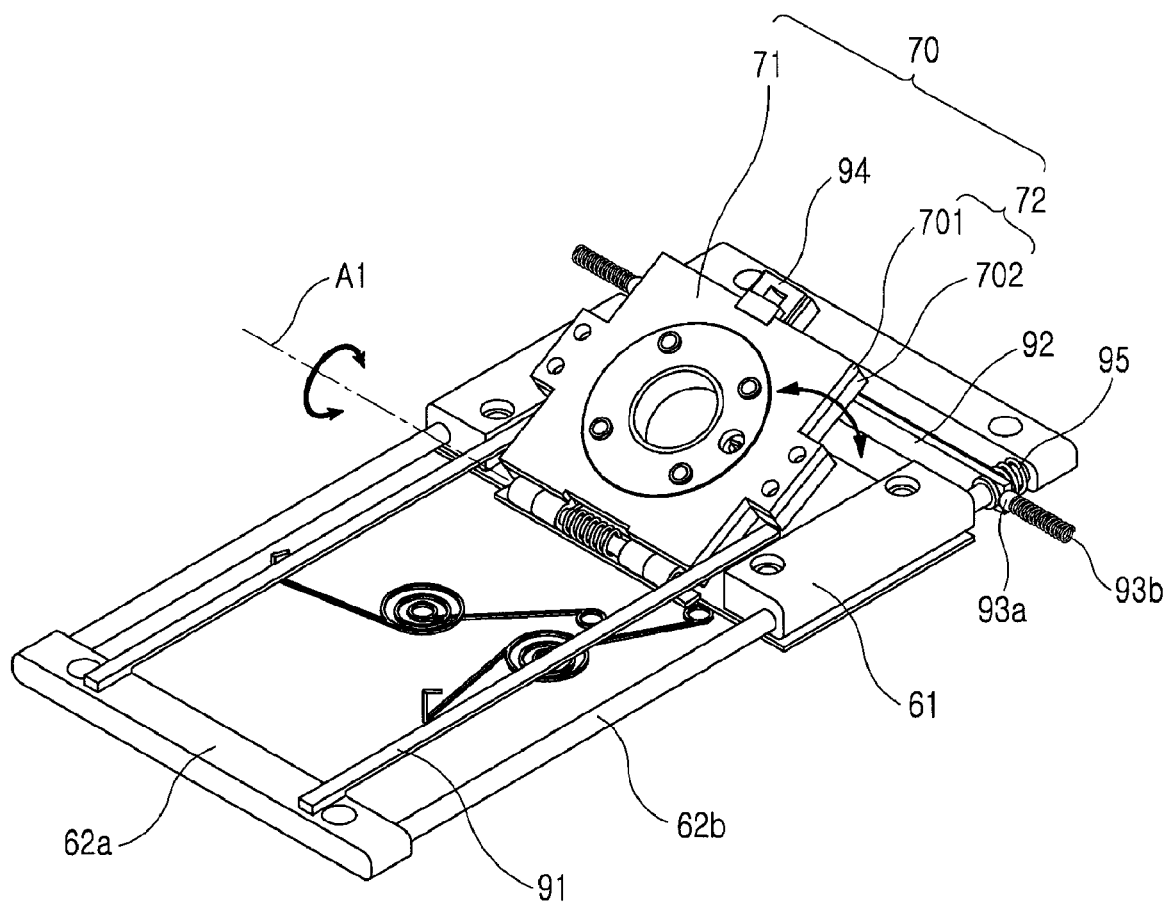
FIG. 13 is a perspective view showing the sliding/swing-type cradling apparatus of the portable terminal according to the exemplary embodiment of the present invention, in which the cradling apparatus is inclined.

As shown in FIG. 13, FIG. 14, and FIG. 15, the locker side force applying means 95 mounted on the guide rod 62b of the guide unit 62 releases the latch of the swing hinge unit 70 and, in addition, returns the stopper 92 to the initial position. The locking click members 93 include contact members 93a and the coil spring 93b. The contact members 93a are disposed at both sides of the guide unit 62 and provide a click when they come into contact with the stopper 92. The contact members 93a receive the elasticity of the coil spring 93b and provide a clicking sound when they contact with the stopper 92.

Figure 16:
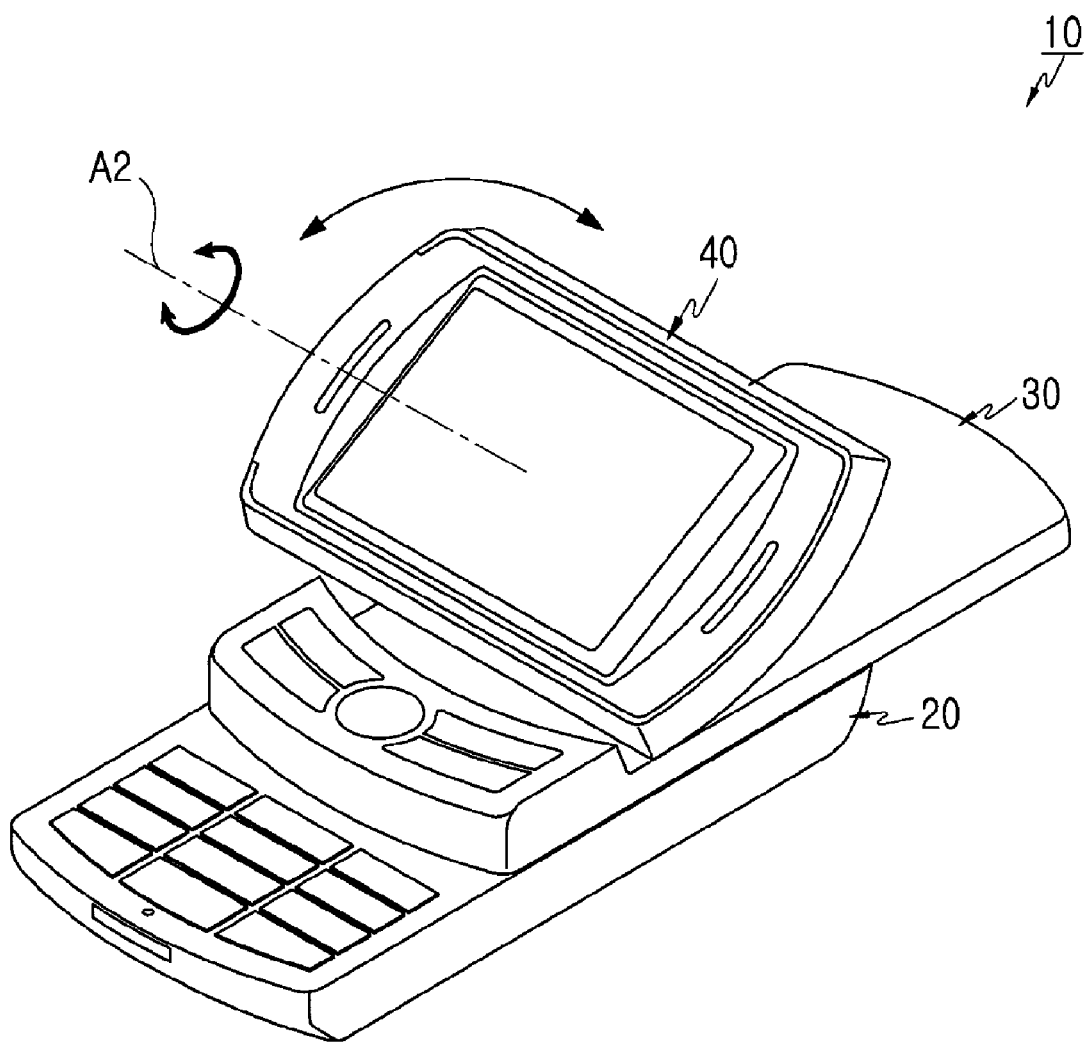
FIG. 16 is a perspective view showing the portable terminal and the sliding/swing-type cradling apparatus thereof according to the embodiment of the present invention, in which the third housing is rotated while being cradled and inclined.

Here, as shown in FIG. 16 and FIG. 17, when the user wants to watch TV and moving pictures through the display unit 42 of the terminal, the user may rotate the third housing 40 about the hinge axis A2 extending perpendicular to the upper surface of the third housing 40 while the third housing is inclined.

As shown in FIG. 18 and FIG. 19, the rotary member 71 of the swing hinge unit 70 is rotated with the third housing 40. The swing hinge unit 70 is provided with the swing locker 94, which engage the locker member 71e protruding on the outer periphery of the rotary member 71 so as to restrict or allow the rotary member 71 to rotate when the third housing 40 is inclined and rotated. The swing locker 94 unlatch the rotary member 71 as the rotary member 71 rotates.

Here, as shown in FIG. 17 and FIG. 18, the swinglocker 94 include a locking member, which is provided with a locking and movement member 94a, a guide groove 94b, and a coil spring 93b.

In this state, as shown in FIG. 17, when a user forcibly rotates the third housing 40, the locker member 71e of the rotary member 71 rotates and is separated from the locking and movement member 94a. At the same time, the swing force applying means 73 enables the rotary member 71 to rotate.

As shown in FIG. 2 and FIG. 19, the swing force applying means 73 includes a spiral spring which has one end 73a is fixedly inserted into a spring hole 71d formed in the rotary member 71, and the other end 73b coupled to a spring coupling protrusion 702d formed in the receiving space 702a of the second hinge member 702. The spiral spring 73 provides elasticity, allowing the rotary member 71 to rotate as soon as the locker member 71e of the rotation member 71 is separated from the locking and movement member 94a.

Here, as shown in FIG. 17, FIG. 18, and FIG. 19, the swing hinge unit 70 includes first and second hinge members 701 and 702. The first hinge member 701 has a rotation stopper 100 formed thereon, which comes into contact with first and second stopper protrusions 201 and 202 protruding from the rotary member 71 to restrict the rotation of the rotary member 71. When the third housing 40 is rotated 90 degrees with respect to the second housing 30, the rotary member 71 also rotates 90 degrees, and the first and second stopper protrusions 201 and 202 rotate with the rotary member 71. The second stopper protrusion 202 comes into contact with the second stopper contacting surface 102 formed on the rotation stopper 100 to stop the rotation of the rotary member 71 after the rotary member 71 rotates 90 degrees.

As shown in FIG. 16, the display unit 42 mounted on the third housing 40 also rotates when the third housing 40 rotates 90 degrees. The user can watch TV and moving pictures through the rotated display unit 42 and can also play games conveniently.

Here, when the third housing 40 is rotated about the hinge axis A2 in a reverse direction in order to return the third housing to an initial position, the rotary member 71 rotates with the third housing 40 and the locker member 71e of the rotary member 71 rotates with the rotary member 71 to engage the locking and movement member 94a.

As shown in FIG. 18, the locking and movement member 94a slides in the guide groove 94b formed on the outer peripheral of the second hinge member 702 while the second hinge member 702 contacts the locker member 71e. At the same time, the locking and movement member 94a slides by the coil spring 94c disposed in the guide groove 94b and engages the locker member 71e to stop the rotation of the rotary member 710. Simultaneously, the first and second stopper protrusions 201 and 202 of the rotary member 71 rotate together. The first stopper protrusion 201 comes into contact with the first stopper contacting surface 101 formed on the rotation stopper 100 to prevent the rotation of the rotary member 71.

As described above, since the display unit of the terminal may slide, be inclined at a desired angle, and rotate in the inclined state, it may be possible for the user to watch TV and moving pictures in a more convenient manner using the cradling function of the terminal.

It will be apparent to those skilled in the art that various modifications and variations can be made in the present invention without departing from the spirit of scope of the invention. Thus, it is intended that the present invention cover the modifications and variations of this invention provided they come within the scope of the appended claims and their equivalents.

What is claimed is:

1. A portable terminal, comprising:
   a first housing;
   a second housing on the first housing, the second housing being slidable along the first housing and facing the first housing; and
   a third housing on the second housing, the third housing comprising a display unit on an upper surface, the third housing being movable with the second housing, the second housing being movable in the sliding direction from a termination position after sliding along the first housing, the third housing being inclinable after the second housing movement in the sliding direction from the termination position and the third housing being rotatable when the third housing is inclined,
   wherein the third housing axis of rotatablity is perpendicular to the upper surface of the third housing at all angles of inclination, and
   the second housing is disposed between the first housing and the third housing.

2. The portable terminal of claim 1, wherein the first housing comprises:
a first speaker unit; and
a first keypad comprising a plurality of keys.

3. The portable terminal of claim 1, wherein the second housing comprises:
a second keypad comprising a plurality of keys; and
a recessed mount surface on which the third housing is disposed to face the second housing.

4. The portable terminal of claim 1, wherein the third housing comprises a plurality of second speakers.

5. The portable terminal of claim 1, wherein the third housing remains inclined and rotatable while the second housing slides along the first housing in an opposite sliding direction from the termination position, and
the third housing being returnable to a flat position on the second housing only after the second housing movement in the sliding direction from the termination position.

6. A sliding/swing-type cradling apparatus for a portable terminal, the portable terminal comprising a first housing; a second housing on the first housing, the second housing being slidable along the first housing and facing the first housing; and a third housing comprising a display unit, the third housing being on the second housing and movable with the second housing, the second housing being movable in the sliding direction from a termination position after sliding along the first housing, and the third housing being inclinable after the second housing movement in the sliding direction from the termination position and the third housing being rotatable when the display unit is inclined, the sliding/swing-type cradling apparatus comprising:
a sliding movement unit to allow the second housing and the third housing to slide along the first housing;
a cradling unit to incline the third housing with respect to the second housing;
a swing hinge unit to rotate the third housing about a hinge axis extending perpendicular to an upper surface of the third housing when the third housing is inclined, the hinge axis being within the perimeter of the third housing; and
a locking unit to restrict the sliding movement of the second housing and the third housing and to allow the second housing and the third housing to move in a sliding direction from a termination position so that the cradling unit can be inclined and the swing hinge unit can rotate,
wherein when the cradling unit is not inclined, the cradling unit can be inclined only after the second and third housings move in the sliding direction from the termination position to unlatch the locking unit, and when the cradling unit is inclined, the cradling unit can be returned flat only after the second and third housings move in the sliding direction from the termination position to unlatch the locking unit.

7. The sliding/swing-type cradling apparatus of claim 6, wherein the sliding movement unit comprises:
a pair of sliding movement members coupled to the second housing;
a guide unit coupled to the first housing and the sliding movement member to allow the sliding movement members to slide; and
a force applying means to apply force to the sliding movement members to close the sliding movement members during the sliding movement of the sliding movement members and to open the sliding movement members when the sliding movement members move a desired distance.

8. The sliding/swing-type cradling apparatus of claim 7, wherein the guide unit comprises a pair of ribs coupled to the first housing and a pair of guide rods coupled to the ribs to guide the sliding movement of the sliding movement members.

9. The sliding/swing-type cradling apparatus of claim 7, wherein the force applying means comprises an elastic body having one end fixed to the sliding movement members and the other end fixedly coupled to the first housing, and wherein the force applying means moves along a predetermined trajectory as the second housing and the third housing slide.

10. The sliding/swing-type cradling apparatus of claim 7, wherein the cradling unit comprises:
a base member coupled to the sliding movement members;
cradling hinge means provided to the base member and the swing hinge unit to rotate the swing hinge unit about a hinge axis to an inclined position; and
cradle-side force applying means provided to the cradle hinge means for applying force to rotate the swing hinge unit at the same time the swing hinge unit is unlatched by the locking unit.

11. The sliding/swing-type cradling apparatus of claim 10, wherein the cradling hinge means comprises:
a first hinge arm disposed at one end of the base member;
a second hinge arm disposed on the swing hinge unit and rotatably coupled to the first hinge arm; and
a hinge rod extending through hinge holes of the first hinge arm and the second hinge arm to couple the first hinge arm and the second hinge arm to each other.

12. The sliding/swing-type cradling of claim 10, wherein the cradle-side force applying means comprises an elastic body.

13. The sliding/swing-type cradling of claim 8, wherein the locking unit comprises:
at least one locker fixed to a rib of the guide unit, the locker contacting and restricted by the swing hinge unit during the sliding movement of the sliding movement members, while being separated from the swing hinge unit so as to release the sliding movement members after the sliding movement of the sliding movement members;
a stopper disposed at one end of the locker unit to restrict movement of the sliding movement members and the swing hinge unit at the sliding termination position;
locking click members disposed adjacent to the stopper, the locking click members to move with the stopper and swing hinge unit to a position at which the locker and the swing hinge unit are unlatched when the sliding movement members further moves in the sliding direction and to contact the stopper to provide a click informing a user that the locker unit and the swing hinge unit are unlatched; and
locker-side force applying means to apply force to the swing hinge unit and the stopper to unlatch the swing hinge unit and to return the stopper to an initial position.

14. The sliding/swing-type cradling apparatus of claim 13, wherein the locker unit is a bar-type and extends only to the sliding termination position of the swing hinge unit.

15. The sliding/swing-type cradling apparatus of claim 13, wherein the locking click members are disposed at both sides of the guide members, each locking click member comprises a contact member to provide click sensitivity when the stopper is contacted, and each contact member comprises a coil spring for providing elasticity.

16. The sliding/swing-type cradling apparatus of claim 13, wherein the locker-side force applying means comprises an elastic body.

17. The sliding/swing-type cradling apparatus of claim 6, wherein the swing hinge unit comprises:
- a rotary member coupled to the third housing;
- a swing hinge member rotatably coupled to the rotary member;
- swing force applying means embedded in the swing hinge member to apply force to rotate the rotary member about the hinge axis; and
- a locking unit facing a periphery of the swing hinge member and slidable along the periphery of the swing hinge member to restrict the swing hinge member as the rotary member rotates.

18. The sliding/swing-type cradling apparatus of claim 17, wherein the rotary member comprises:
- a thru-hole at a center portion of the rotary member to receive the swing hinge member;
- a separation prevention jaw disposed at an edge of the rotary member and rotatably inserted in a rotation hole disposed in the swing hinge member to prevent the separation of the rotary member; and
- at least one screw hole through which a screw extends and fixes the rotary member to the third housing.

19. The sliding/swing-type cradling apparatus of claim 17, wherein the swing hinge member comprises:
- a first hinge member and
- a second hinge member;
- the first hinge member comprising:
  - a rotation hole at a center portion of the first hinge member to receive the rotary member; and
- the second hinge member comprising:
  - a receiving space to receive the swing force applying means;
  - a cylindrical housing protruding from a center portion of the receiving space to be inserted into the thru-hole in the rotary member; and
  - second screw holes disposed at an edge of the second hinge member and corresponding to the first screw holes disposed in the first hinge member;
- wherein the first hinge member and the second hinge member are coupled to each other with screws.

20. The sliding/swing-type cradling apparatus of claim 19, wherein the swing force applying means comprises:
- a spiral spring having one end fixedly inserted into a spring hole disposed in the rotary member and the other end disposed on a spring coupling protrusion disposed in the receiving space of the second hinge member.

21. The sliding/swing-type cradling apparatus of claim 17, wherein the locking unit comprises:
- a locking member engaged with a locker protruding from an outer periphery of the rotary member to restrict or release the rotary member.

22. The sliding/swing-type cradling apparatus of claim 21, wherein the locking member comprises:
- a locking and movement member to contact and slide along the locker of the rotary member;
- a guide groove to receive the locking and movement member and guide the sliding movement of the locking and movement member; and
- a coil spring disposed in the guide groove, to provide elasticity to the locking and movement member.

23. The sliding/swing-type cradling apparatus of claim 22, wherein the locking and movement member comprises a spherical ball.

24. The sliding/swing-type cradling apparatus of claim 19, wherein the first hinge member further comprises:
- a rotation stopper disposed on the first hinge member to contact a first stopper and a second stopper protruding from the edge of the rotary member to restrict the rotation of the rotary member.

25. The sliding/swing-type cradling apparatus of claim 24, wherein the rotation stopper comprises:
- a first stopper contacting surface disposed at one end of the rotation stopper to contact the first stopper protrusion and prevent the rotation member from rotating,; and
- a second stopper contacting surface disposed at the other end of the rotation stopper to enable the rotation member to rotate 90 degrees about the hinge axis and contact the second stopper protrusion, which stops the rotation of the rotation member.

26. The sliding/swing-type cradling apparatus of claim 21, wherein the locker of the rotation member is separated from the locking and movement member of the locking member when the third housing is rotated 90 degrees about the hinge axis with respect to the second housing by the swing force applying means, while the locker is inserted into the locking and movement member and stops the rotation of the rotation member at an initial position when the third housing is rotated about the hinge axis in a reverse direction.

27. The sliding/swing-type cradling apparatus of claim 6, wherein the second housing further comprises a coupling hole rotatably coupled to the swing hinge unit.

* * * * *